March 13, 1928.
O. O. NEWHOUSE
1,662,390
MILK AND CREAM COOLER AND AERATOR
Filed June 10, 1926    2 Sheets-Sheet 1
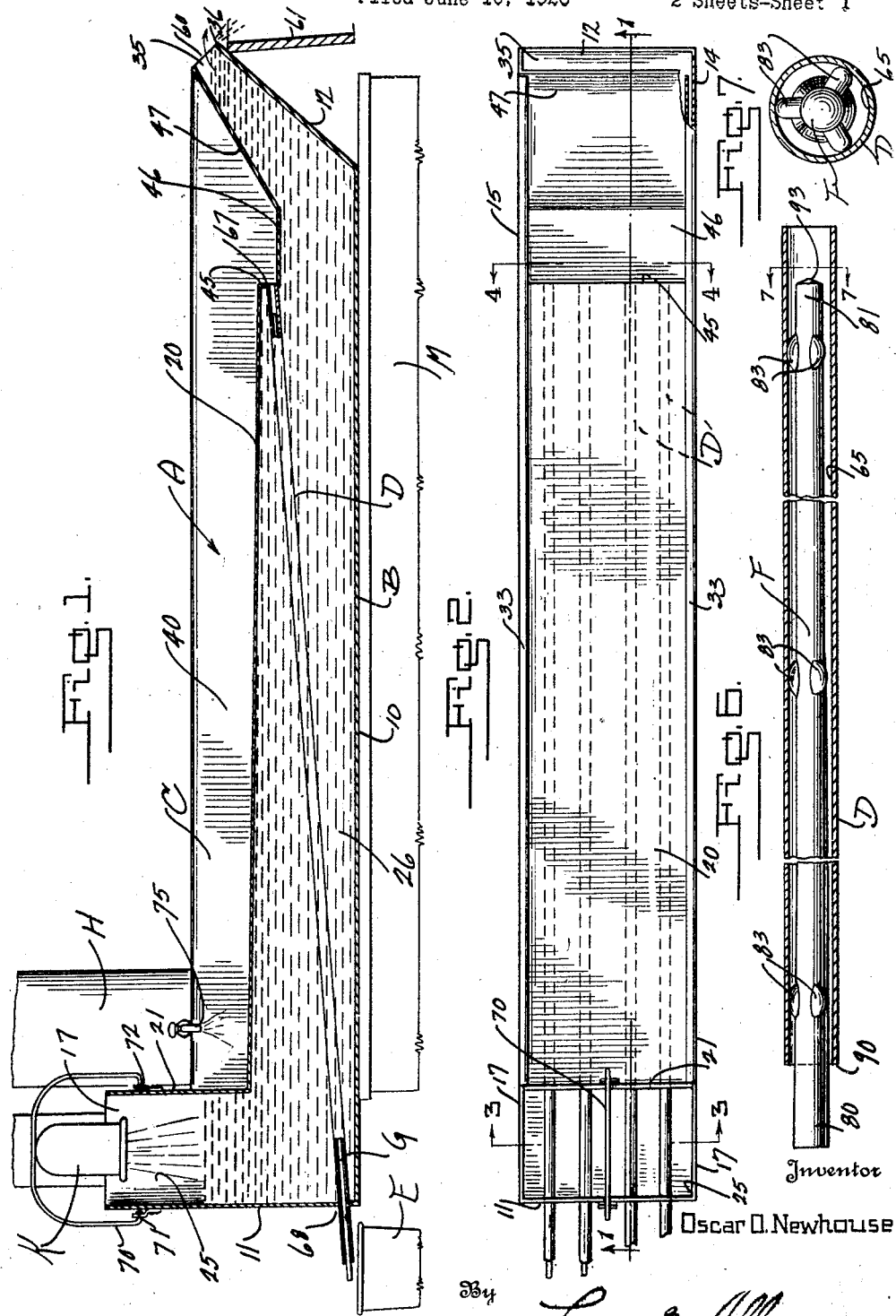
Inventor
Oscar O. Newhouse
By Lancaster & Allwine Attorneys March 13, 1928.
O. O. NEWHOUSE
1,662,390
MILK AND CREAM COOLER AND AERATOR
Filed June 10, 1926    2 Sheets-Sheet 2
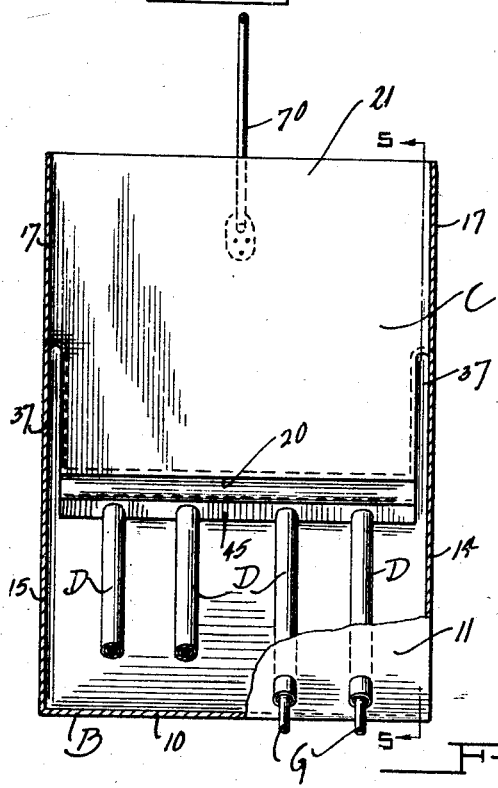
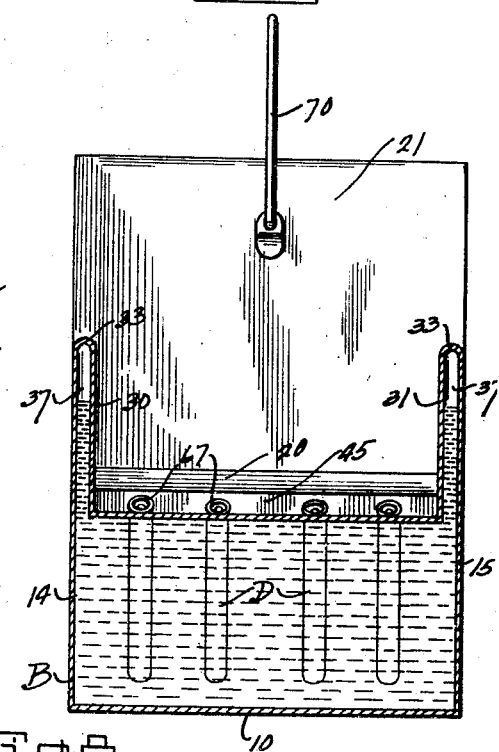
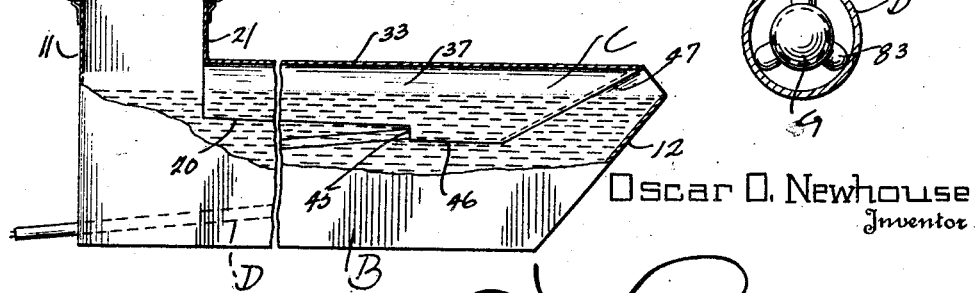
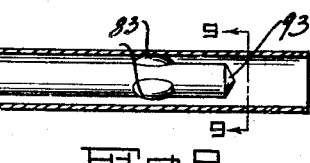
Oscar O. Newhouse
Inventor
By Lancaster Allwine
Attorneys Patented Mar. 13, 1928.

1,662,390

UNITED STATES PATENT OFFICE.

OSCAR O. NEWHOUSE, OF BRANDON, MINNESOTA.

MILK AND CREAM COOLER AND AERATOR.

Application filed June 10, 1926. Serial No. 115,066.

This invention relates to improvements in means for cooling and aerating milk and cream and other liquids.

Immediately after milking it is desirable to cool as well as aerate the milk and cream, in order to prevent multiplication of bacteria and to eliminate objectionable flavors from the liquid. Apparatus has heretofore been provided for cooling the milk and cream, but the improved apparatus of this invention simultaneously cools and aerates the milk or cream, in the most efficient and expeditious manner which renders the thorough treatment of the milk or cream practical, and hence enhances the value thereof.

A further object of this invention is the provision of improved apparatus for the cooling of milk embodying improved means for regulating the flow of milk thru the cooling medium.

A further object of this invention is the provision of a liquid cooler, preferably adapted to be used in connection with the cooling of milk or cream, embodying improved milk flow retarding means for properly regulating the flow and thickness of the stream of milk or cream as it passes over a cooling surface which has been cooled by the cooling medium.

A further object of this invention is the provision of improved apparatus for aerating and cooling milk or cream including means to permit the thorough aeration of the milk or cream during a quickened flow of the milk or cream, while the same is being thoroughly cooled.

Other objects and advantages of this invention will be apparent during the course of the following detailed description.

In the accompanying drawings, forming a part of this specification, and wherein similar reference characters designate corresponding parts throughout the several views, Figure 1 is a longitudinal sectional view taken thru the improved milk or cream cooler and aerator.

Figure 2 is a plan view of the apparatus illustrated in Figure 1.

Figures 3 and 4 are transverse sectional views taken substantially on their respective lines in Figure 2 of the drawings.

Figure 5 is a fragmentary sectional view taken substantially on the line 5—5 of Figure 3.

Figure 6 is an enlarged fragmentary sectional view taken along a cooling tube, showing a novel type of flow retarding member used therein.

Figure 7 is a sectional view taken substantially on the line 7—7 of Figure 6.

Figure 8 is a fragmentary longitudinal sectional view taken through a milk or cream cooling tube, showing a modified form of flow retarding member used therein.

Figure 9 is a sectional view taken substantially on the line 9—9 of Figure 8.

In the drawings, wherein for the purpose of illustration are shown preferred and modified embodiments of this invention, the letter A may generally designate the improved apparatus, which may consist of a casing construction B adapted to receive a cooling medium, having a novel milk or cream supporting and aerating trough C associated in a novel manner within the casing B. Novel cooling tubes D are supported in a novel relation with respect to the casing B and trough C, wherein the milk or cream may flow from the trough C to any suitable location E, such as a pail or receptacle for receiving the milk or cream after being treated. Novel retarders F and G may be used in selective manner in the tubes D for retarding the rate of flow of the milk or cream through the tubes D, and to increase the cooling efficiency of said tubes. A regulating milk or cream container H may be used for dispensing the milk or cream into the trough C, and the housing B may be formed to associate with a cooling medium supply nozzle K.

The casing B preferably consists of a flat bottom wall 10, adapted to be horizontally positioned; the same being of any desired width and being elongated, at one end thereof having a vertical end wall 11, and at the opposite end thereof having an upwardly sloping end wall 12 at an angle of approximately 45°. Longitudinally extending side walls 14 and 15 are provided as a part of the casing B, the height of the said walls being less than the height of the end wall 11, and adjacent the end wall 11 the said walls are upwardly extended at 17 to the same height as the wall 11 to which they are connected.

The milk or cream aerating trough C is of a novel construction, including a sloping bottom wall 20, which at one end thereof is provided with a vertical upstanding wall 21, which at the side edges thereof is connected with the side edges of the wall extensions 17, at the opposite edges of the latter from the end wall 11, to provide an inlet opening 25 to the compartment 26 of the casing B thru which water is fed from the supply nozzle K. Side walls 30 and 31 are provided as a part of the trough construction C, which at their upper edges are preferably integrally connected at 33 to the upper edges of the side walls 14 and 15 respectively of the elongated receptacle B; it being understood that the walls 30 and 31 extend downwardly in spaced parallel relation along the walls 14 and 15, to hold the bottom sloping wall 20 of the trough C in a properly spaced relation above the bottom 10 of the elongated casing B, to provide an elongated chamber 26 along which the cooling medium flows from the inlet opening 25 to the opposite end of the receptacle B for discharge thru an outlet opening 35 at the top edge 36 of the sloping end wall 12. The spaces 37 between the side walls of the aerating trough C and the side walls of the casing are relatively shallow, but they communicate with the chamber above the bottom 10 and between the side walls 14 and 15 in order that the cooling medium may pass upwardly into the spaces 37 to predetermined distances, to cool the milk flowing along the trough compartment 40, in a manner which is readily apparent. The bottom 20 of the aerating trough C it is to be noted also forms a top wall for the cooling medium compartment of the housing B, and this wall 20 slopes downwardly from the end wall 21 towards the outlet for the cooling medium of the tank B. The wall 20 at the lower end thereof is dropped in substantially vertical relation at 45, and the remaining portion 46 of the bottom wall of the trough C from the dropped portion 45 towards the end wall 47 of the trough C is preferably horizontally positioned in a plane slightly below the sloping bottom 20, to provide a sort of depressed trap in the lower portion of the trough C at the end thereof adjacent the outlet opening 35, to which all the milk or cream will ultimately flow in its travel along the trough C, for passage therefrom into the cooling tubes D, as will be subsequently mentioned. The sloping end wall 47 of the trough C is inclined to the horizontal and vertical, and the same converges with respect to the plane of the wall 12, so that the outlet opening 35 gradually restricts from the cooling medium compartment 26 to the uppermost edge 60 surrounding the outlet opening 35, as can readily be seen from Figure 1 of the drawings. The spaces 37 open into the water space between the sloping walls 12 and 47 at the end of the housing B, so that there will be no tendency for air to be trapped in the said spaces 37 since all air will be forced upwardly into the spaces 37 and will then travel along the connecting edges 33 of the trough and side walls to be ultimately discharged thru the inlet or outlet opening of the housing B, in a relation which is perfectly obvious. A suitable dash board 61 may be placed at the cooling liquid discharge end of the improved cooler and aerator, as illustrated in Figure 1, to prevent the splashing of the water as it is discharged thru the opening 35.

The cooling tubes D are of any approved length, and number, the same preferably being of hollow cylindrical form, having passageways 65 therethrough, of uniform diameter from end to end of the said tubes. The tubes D at an end of each are connected at 67 in the vertical drop portion 45 of the aerating trough wall construction, and from thence slope downwardly at a slight incline to the horizontal, longitudinally through the water space 26 between the walls 10 and 20, in a general direction towards the end wall 11 of the cooler housing or casing B, and said tubes D exit at 68, preferably adjacent the base end of the end wall 11, so that the passageways 65 of said cooling tubes D outlet exteriorly of the casing B directly over the cream or milk receptacle E. Of course the tubes D may be provided in any approved number and they are preferably arranged in parallel spaced relation with their upper ends communicating with the trap end 46 of the trough compartment 40 and from thence each of the same slopes downwardly to the outlet above mentioned.

At the inlet end of the housing B, a supporting bail 70 is preferably provided, pivotally connected at 71 and 72; the bail being of U-shaped formation and being adapted to engage over the nozzel K, which may be a water faucet or pump nozzle; this bail being for the purpose of supporting the inlet end of the improved cooler or aerator; the opposite end being adapted to rest upon a support M, although it is to be understood that the bail 70 may be done away with if desired and the improved device supported otherwise than as above mentioned.

The receptacle H is preferably an ordinary container for initially receiving the warm milk or cream, and it is provided with a regulating valve 75 thru which the milk or cream flows into the upper end of the trough C adjacent the inlet end of the housing B for the cooling treatment, so that the warm milk or cream will flow into the trough compartment 40 and then downwardly along the sloping wall 20 into the trap end of the trough compartment upon the wall 46, and from thence the milk flows through the cooling tubes D and is properly cooled, as is obvious. During its path of travel along the trough compartment 40, which is preferably opened entirely at the top thereof, the warm milk or cream is aerated to free the same of objectionable flavors, and during this course of flow the milk or cream is also cooled due to the fact that the cooling medium surrounds the bottom side and end walls of the trough C and cools the flowing milk or cream. The housing construction B and trough C are preferably of some highly conductive sheet metal formation, integrally connected or soldered together in any approved manner, and thus the cooling medium most efficiently cools the body of milk or cream as it flows along the trough C.

Referring to the flow retarders F and G the same are placed in the cooling tubes D for the purpose of retarding the flow of liquid therealong, according to the viscosity of the liquid, and the same also have an important function in that they centrally fill the tubes to provide an annular chamber thereabout through which the liquid flows in contact with the cooled walls of the tubes D, to most efficiently cool the milk or cream or other liquid. The retarder F is preferably formed of a solid straight elongated rod of any approved material, and the same is tapered from the end 80 where it is of greatest diameter to the end 81 where it is of least diameter, the taper being gradual. At spaced points along the retarder F peripheral series of spaced projections 83 are provided, which are segmental in form, having outer convex surfaces adapted to engage with a point contact with the inner periphery of the passageway 65 of a tube D in order to insure that the periphery of the main body of the retarder does not itself assume such contact in the tube D. This insures that there will be an annular chamber between the outer periphery of the main body of the retarder and the inner periphery of the tube D, along which the milk or cream will be caused to flow to receive the maximum cooling benefit, and to suitably retard the flow of the liquid according to the viscosity thereof. Of course, with the tapered retarder F the farther that the same is inserted in the tube D, from the outlet end of said tube D, the more restricted will be the flow of the milk or cream or other liquid along the tube D, as is perfectly apparent, and it is intended that the retarders F and G shall be inserted from the outlet ends of the tubes D, and have end portions thereof projecting from the outer edges 90 of said tubes D, to facilitate the adjustable positioning of said retarders.

As to the retarder G the same is of exactly the same construction as the retarder F, except that the main body portion 91 thereof is of uniform diameter from end to end, but it is provided with the spacing projections 83 above outlined for the retarder F, and of the same formation, and provided for the same purpose. With the retarder G it is only possible to secure one retarding adjustment of the fluid which passes thru the tubes D. The inner stream dividing ends 93 of the retarders F and G are preferably pointed.

From the foregoing description of this invention it is apparent that a novel milk, cream or other liquid cooler and aerator has been provided, which is of a practical, economical, and efficient construction best adapted to serve the purposes above outlined.

The retarders F and G are not absolutely necessary where the fluid is sufficiently viscid to present a retarded flow. Milk flows more freely than cream through the cooling tubes, and hence it will be desirable under certain circumstances to use the retarders when cooling milk, in order to retard the rapid flow of the milk through the cooling tubes to about the same degree of flow as cream will have in the cooling tubes without the retarders. Under any circumstances of use the retarders may or may not be used.

The cooling tubes may be of other shape than round, and may present an irregular cross section with an elongated opening which is of only sufficient area to produce a retarded flow. Valves of the gate type may also be used at the outlet ends of the cooling tubes to retard the flow of liquid therethrough, as well as various other expedients.

Various changes in the shape, size, and arrangement of parts may be made to the forms of invention herein shown and described, without departing from the spirit of the invention or the scope of the claims.

I claim:

1. In a cooler of the class described the combination of an elongated receptacle having a passageway therealong for receiving a flowing cooling medium, a trough supported in the passageway of said casing being open at the top thereof, means for feeding milk or other liquid into one end of the trough for flow therealong, and means for receiving the milk or other liquid at the opposite end of the trough and causing it to flow through the cooling medium in said passageway counter to the flow which said liquid takes along said trough.

2. In a cooler of the class described the combination of an elongated receptacle having a passageway therealong for receiving a flowing cooling medium, a trough supported in the passageway of said casing being open at the top thereof, means for feeding milk or other liquid into one end of the trough for flow therealong, means for receiving the milk or other liquid at the opposite end of the trough and causing it to flow through the cooling medium in said passageway counter to the flow of said liquid along said trough, and means for regulating and retarding flow of the said liquid along said last mentioned means.

3. In a cooler of the class described the combination of an elongated receptacle including bottom, side and end walls, a trough including bottom, side and end walls, and means for supporting the trough in the receptacle so that its bottom, side and end walls are in respective spaced relation with the bottom, side and end walls of the receptacle, the end walls of the trough and receptacle at both ends being spaced to provide inlet and outlet openings at the top of the said end walls and at the opposite ends of the receptacle for receiving a cooling medium which is adapted to flow between the bottom walls of the receptacle and trough and between the side walls of said receptacle and trough.

4. In a cooler of the class described the combination of an elongated receptacle including bottom, side and end walls, a trough including bottom, side and end walls, means for supporting the trough in the receptacle so that its bottom, side and end walls are in respective spaced relation with the bottom, side and end walls of the receptacle, the end walls of the trough and receptacle at both ends being spaced to provide inlet and outlet openings at the top of the receptacle and at the opposite ends of the receptacle for receiving a cooling medium which is adapted to flow between the bottom walls of the receptacle and trough and between the side walls of said receptacle and trough, the end walls of said receptacle and trough being inclined in a convergent relation towards the outlet opening.

5. In a cooler of the class described the combination of a receptacle having a compartment therein, a trough having a compartment therein and including a bottom wall, said bottom wall at one end being formed to provide a depressed trap, means supporting the trough in the compartment of the receptacle to provide a passageway in the compartment of the receptacle between the trough and receptacle for flow of a cooling medium, said passageway at one end being open to provide an inlet opening and the opposite end being open to provide an outlet opening adjacent the trap of said trough, and tubular means connected in the trap of said trough and passing with a downward slope to the horizontal along the passageway between the trough and receptacle towards the inlet opening end of said receptacle.

6. In a cooler of the class described the combination of a casing portion having a compartment therein, a trough having a sloping bottom wall, means supporting the trough in the receptacle compartment to provide a passageway below the bottom wall thereof, said bottom wall at the lower end thereof being formed to provide a trap, means for feeding milk or other liquid into the upper end of the trough for flow towards said trap, means for draining the liquid from said trap, said means including a conduit connected with the trap and being inclined to the horizontal below the bottom wall of the trough and extending towards the end of the trough into which the milk or other liquid is first placed for causing the milk or other liquid to flow in a direction counter to the direction in which the same flows along said trough, and retarders for regulating the flow of milk along said conduit.

7. In a cooler the combination of a receptacle including a bottom wall, side walls, a relatively high inlet end wall and an inclined outlet end wall, a trough less in length than the length of said receptacle including a sloping bottom wall, side walls, an upstanding inlet end wall and an inclined outlet end wall, means connecting the upper marginal portions of the side walls of the receptacle and trough to place the side walls of the receptacle and trough in spaced relation with the bottom of the trough supported above the bottom wall of the casing in a spaced relation therewith to provide a cooling medium flow passageway, the inlet end walls of the trough and receptacle being spaced to provide an inlet opening for receiving a cooling medium, and the inclined outlet end walls of the trough and receptacle being disposed in a convergent relation towards an outlet opening at the upper edges thereof, means at the inlet opening to support that end of the trough and receptacle, and means at the lower end of the sloping trough wall for withdrawing milk or other liquid which is adapted to flow along said trough.

8. In a cooler the combination of a receptacle including a bottom wall, side walls, a relatively high inlet end wall and an inclined outlet end wall, a trough less in length than the length of said receptacle including a sloping bottom wall, side walls, an upstanding inlet end wall and an inclined outlet end wall, means connecting the upper marginal portions of the side walls of the receptacle and trough to place the side walls of the receptacle and trough in spaced relation with the bottom of the trough supported above the bottom wall of the receptacle in a spaced relation therewith to provide a cooling medium flow passageway, the inlet end walls of the trough and receptacle being spaced to provide an inlet opening for receiving a cooling medium, and the inclined outlet end walls of the trough and receptacle being disposed in a convergent relation towards an outlet opening at the upper edges thereof, means at the inlet opening to support that end of the trough and receptacle, means at the lower end of the sloping trough wall for withdrawing milk or other liquid which is adapted to flow along said trough including a series of tubes connected with the lower end of said trough and being inclined to the horizontal in the passageway between the bottom walls of the trough and receptacle extending towards the inlet end wall of the casing and passing therethrough, said tubes having outlet openings therethrough for receiving milk or other medium to cause the same to flow in a path counter to the path which the same takes along the sloping bottom wall of said trough.

9. In a cooler the combination of a receptacle including a bottom wall, side walls, a relatively high inlet end wall and an inclined outlet end wall, a trough less in length than the length of said receptacle including a sloping bottom wall, side walls, an upstanding inlet end wall and an inclined outlet end wall, means connecting the upper marginal portions of the side walls of the receptacle and trough to place the side walls of the receptacle and trough in spaced relation with the bottom of the trough supported above the bottom wall of the receptacle in a spaced relation therewith to provide a cooling medium flow passageway, the inlet end walls of the trough and receptacle being spaced to provide an inlet opening for receiving a cooling medium, the inclined outlet end walls of the trough and receptacle being disposed in a convergent relation towards an outlet opening at the upper edges thereof, means at the inlet opening to support that end of the trough and receptacle, means at the lower end of the sloping trough wall for withdrawing milk or other liquid which is adapted to flow along said trough, a series of tubes connected with the lower end of said trough and being inclined to the horizontal in the passageway between the bottom walls of the trough and receptacle and extending towards the inlet end wall of the receptacle and passing therethrough, said tubes having outlet openings therethrough for receiving milk or other medium to cause the same to flow in a path counter to the path which the same takes along the sloping bottom wall of said trough, and retarding means in the passageways of said tubes for regulating the flow of milk or other liquid therethrough.

10. In a cooler of the class described the combination of a receptacle having a compartment therein, for receiving a flowing cooling medium, a trough supported in the compartment of said receptacle being open at the top thereof, said trough having a passageway therealong with a sloping bottom for gravity flow of milk or other liquid along said passageway from one end of the trough to the opposite end thereof, the trough being so disposed within the compartment of the receptacle that the receptacle has a cooling medium inlet opening at one end and a cooling medium discharge opening at the opposite end, and conduit means connected with the trough passageway at the end thereof towards which the milk flows and extending in a downwardly sloping relation through the compartment of the receptacle below the trough for submergence by the cooling liquid, said conduit means being adapted to carry the milk or the like from the trough in a thinly flowing stream countercurrent to the passage of cooling medium along said receptacle compartment, and the conduit means having an outlet exteriorly of the trough and receptacle compartment.

11. In a cooler of the class described the combination of a receptacle having a compartment therein for receiving a flowing cooling medium, a trough supported in the compartment of said receptacle being open at the top thereof, said trough having a passageway therealong with a sloping bottom for gravity flow of milk or other liquid along said passageway from one end of the trough to the opposite end thereof, the trough being so disposed within the compartment of the receptacle that the receptacle has a cooling medium inlet opening at one end and a cooling medium discharge opening at the opposite end, conduit means connected with the trough passageway at the end thereof towards which the milk flows and extending in a downwardly sloping relation through the compartment of the receptacle below the trough for submergence by the cooling liquid, said conduit means being adapted to carry the milk or the like from the trough in a thinly flowing stream countercurrent to the passage of cooling medium along said receptacle compartment, the conduit means having an outlet exteriorly of the trough and receptacle compartment, and means cooperating with said conduit means to retard the flow of milk therethrough.

OSCAR O. NEWHOUSE.